(12) United States Patent
Ali et al.

(10) Patent No.: US 12,373,163 B2
(45) Date of Patent: Jul. 29, 2025

(54) SYSTEM AND METHOD FOR ACTIVATING A VOICE ASSISTANT FOR A VEHICLE

(71) Applicant: GM Global Technology Operations LLC, Detroit, MI (US)

(72) Inventors: Kamran Ali, Troy, MI (US); Mohamed A. Layouni, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 18/469,086

(22) Filed: Sep. 18, 2023

(65) Prior Publication Data

US 2025/0094122 A1    Mar. 20, 2025

(51) Int. Cl.
*G06F 40/284*    (2020.01)
*G06F 3/16*    (2006.01)
(Continued)

(52) U.S. Cl.
CPC ............ *G06F 3/167* (2013.01); *G06F 40/284* (2020.01); *G06F 40/58* (2020.01); *H04B 7/0626* (2013.01)

(58) Field of Classification Search
CPC ...... G06F 40/211; G06F 40/268; G06F 3/167; G06F 40/58; G06F 40/284; H04B 7/0626; G06N 3/044; G06N 3/08; G06N 3/045
See application file for complete search history.

(56) References Cited

U.S. PATENT DOCUMENTS 5,602,734 A    2/1997    Kithil
7,106,203 B2    9/2006    Edwards et al.
(Continued)

FOREIGN PATENT DOCUMENTS

DE    10144877 A1    4/2003
DE    10341578 A1    4/2005
(Continued)

OTHER PUBLICATIONS

Institute of Electrical and Electronics Engineers. "Standard for Low-Rate Wireless Networks," IEEE Std 802.15.4™M-2020, 2020, pp. 1-799.
(Continued)

*Primary Examiner* — Pierre Louis Desir
(74) *Attorney, Agent, or Firm* — Vivacqua Crane, PLLC

(57) ABSTRACT

A system for activating a voice assistant of a vehicle includes a microphone, a first wireless module, a second wireless module, and a controller in electrical communication with the microphone, the first wireless module, and the second wireless module. The controller is programmed to transmit a plurality of original training signals on a plurality of subcarriers using the first wireless module. The controller is further programmed to receive a plurality of propagated training signals using the second wireless module. The controller is further programmed to determine a deviation between the plurality of original training signals and the plurality of propagated training signals. The controller is further programmed to identify a motion marker based at least in part on the deviation. The controller is further programmed to activate the voice assistant of the vehicle to receive a voice command using the microphone based at least in part on the motion marker.

18 Claims, 9 Drawing Sheets

(51) Int. Cl.
   *G06F 40/58*     (2020.01)
   *H04B 7/06*      (2006.01)

(56) References Cited

U.S. PATENT DOCUMENTS

| | | |
|---|---|---|
| 11,600,278 B2 | 3/2023 | Khamis et al. |
| 11,956,046 B2 | 4/2024 | Ali et al. |
| 2002/0136176 A1 | 9/2002 | Abeta et al. |
| 2002/0140215 A1 | 10/2002 | Breed et al. |
| 2004/0119599 A1 | 6/2004 | Stevenson et al. |
| 2004/0130442 A1 | 7/2004 | Breed et al. |
| 2007/0221428 A1 | 9/2007 | Strutz et al. |
| 2008/0077546 A1 | 3/2008 | Hofbeck et al. |
| 2009/0017838 A1 | 1/2009 | Laroia et al. |
| 2013/0314223 A1 | 11/2013 | Masudaya et al. |
| 2014/0057580 A1 | 2/2014 | Rofougaran et al. |
| 2016/0111878 A1 | 4/2016 | Qureshi et al. |
| 2019/0097865 A1 | 3/2019 | Xu et al. |
| 2019/0176837 A1* | 6/2019 | Williams ............ G06V 20/593 |
| 2020/0047687 A1 | 2/2020 | Camhi et al. |
| 2020/0169275 A1 | 5/2020 | Chahal et al. |
| 2020/0172049 A1 | 6/2020 | Scheele et al. |
| 2021/0086778 A1* | 3/2021 | Suthar .................. B60W 40/08 |
| 2021/0291823 A1* | 9/2021 | Newman ................. G08G 1/16 |
| 2022/0188624 A1* | 6/2022 | Kuehnle ................. G06N 5/02 |
| 2023/0039726 A1 | 2/2023 | Ricart et al. |
| 2023/0199702 A1 | 6/2023 | Johnsson et al. |
| 2023/0262750 A1 | 8/2023 | Krajnc et al. |
| 2023/0299829 A1* | 9/2023 | Ali ....................... B60W 40/08 370/252 |
| 2023/0341535 A1 | 10/2023 | Zhang et al. |
| 2024/0414288 A1* | 12/2024 | Ali ....................... H04W 24/08 |

FOREIGN PATENT DOCUMENTS

| | | |
|---|---|---|
| DE | 102007055091 A1 | 5/2009 |
| DE | 102022133883 A1 | 6/2023 |
| DE | 102022126688 A1 | 9/2023 |

OTHER PUBLICATIONS

"Short Range Bluetooth Wireless invention," Questel Research Disclosure No. 710019, ISSN 0374-4353, published Apr. 2023.

United States Patent and Trademark Office. U.S. Appl. No. 17/699,715, filed Mar. 21, 2022.

United States Patent and Trademark Office. U.S. Appl. No. 17/699,726, filed Mar. 21, 2022.

United States Patent and Trademark Office. U.S. Appl. No. 18/332,967, filed Jun. 12, 2023.

* cited by examiner

SYSTEM AND METHOD FOR ACTIVATING A VOICE ASSISTANT FOR A VEHICLE

INTRODUCTION

The present disclosure relates to a system and method for activating a voice assistant of a vehicle.

Vehicle voice assistant features are used to enable persons to interact with the vehicle by providing voice commands. Motion detection systems may be used to verify that voice commands are intentional and authorized. Various technologies currently exist for detecting the presence of an individual near a vehicle. For example, one type of motion detection system may include radar-based sensors disposed with a body of the vehicle to detect the presence of an individual. However, radar-based sensors may be obstructed by objects in the environment, reducing performance. Camera-based systems for detecting motion and presence also exist, however, continuous camera recording and/or streaming may result in increased resource use. Touch-based motion detection mechanisms require an individual to touch the vehicle. Sound-based motion detection mechanisms may experience reduced performance in environments with loud and/or varying sound levels.

Thus, while current voice assistant and motion detection systems achieve their intended purpose, there is a need for a new and improved system and method for activating a voice assistant of a vehicle.

SUMMARY

According to several aspects, a system for activating a voice assistant of a vehicle is provided. The system may include a microphone, a first wireless module, a second wireless module, and a controller in electrical communication with the microphone, the first wireless module, and the second wireless module. The controller is programmed to transmit a plurality of original training signals on a plurality of subcarriers using the first wireless module. The controller is further programmed to receive a plurality of propagated training signals using the second wireless module. The controller is further programmed to determine a deviation between the plurality of original training signals and the plurality of propagated training signals. The controller is further programmed to identify a motion marker based at least in part on the deviation. The controller is further programmed to activate the voice assistant of the vehicle to receive a voice command using the microphone based at least in part on the motion marker.

In another aspect of the present disclosure, to identify the motion marker, the controller is further programmed to determine a plurality of channel state information (CSI) values based at least in part on the deviation between the plurality of original training signals and the plurality of propagated training signals. To identify the motion marker, the controller is further programmed to identify the motion marker based at least in part on the plurality of CSI values. The motion marker includes at least one of: a low-fidelity motion marker and a high-fidelity motion marker.

In another aspect of the present disclosure, to identify the motion marker, the controller is further programmed to calculate a plurality of CSI value derivatives. At least one of the plurality of CSI value derivatives corresponds to each of the plurality of subcarriers. To identify the motion marker, the controller is further programmed to calculate a plurality of CSI value derivative magnitudes. Each of the plurality of CSI value derivative magnitudes is a magnitude of one of the plurality of CSI value derivatives. To identify the motion marker, the controller is further programmed to calculate a norm of the plurality of CSI value derivative magnitudes. To identify the motion marker, the controller is further programmed to calculate a time averaged norm signal based at least in part on the norm. To identify the motion marker, the controller is further programmed to continuously compare the time averaged norm signal to a predetermined time averaged norm signal threshold. To identify the motion marker, the controller is further programmed to identify the low-fidelity motion marker in response to determining that the time averaged norm signal is greater than or equal to the predetermined time averaged norm signal threshold.

In another aspect of the present disclosure, to identify the motion marker in an environment surrounding the vehicle, the controller is further programmed to determine a motion classification of the plurality of CSI values using a machine learning algorithm. The machine learning algorithm is configured to receive the plurality of CSI values as an input and provide the motion classification of the plurality of CSI values as an output. The motion classification of the plurality of CSI values includes at least one of: a motion toward the vehicle and a motion away from the vehicle. To identify the motion marker in an environment surrounding the vehicle, the controller is further programmed to identify the high-fidelity motion marker in response to determining that the motion classification of the plurality of CSI values is the motion toward the vehicle.

In another aspect of the present disclosure, to activate the voice assistant of the vehicle to receive a voice command using the microphone based at least in part on the motion marker, the controller is further programmed to activate the microphone to receive a voice assistant keyword in response to determining that the motion marker includes the low-fidelity motion marker. To activate the voice assistant of the vehicle to receive a voice command using the microphone based at least in part on the motion marker, the controller is further programmed to determine a location of a key fob relative to the vehicle in response to detecting the voice assistant keyword using the microphone. To activate the voice assistant of the vehicle to receive a voice command using the microphone based at least in part on the motion marker, the controller is further programmed to perform a multifactor authentication process in response to determining that a distance between the key fob and the vehicle is less than or equal to a predetermined key fob distance and that the motion marker further includes the high-fidelity motion marker. To activate the voice assistant of the vehicle to receive a voice command using the microphone based at least in part on the motion marker, the controller is further programmed to execute a voice command received using the microphone in response to determining that the multifactor authentication process is performed successfully.

In another aspect of the present disclosure, to activate the voice assistant of the vehicle to receive a voice command using the microphone based at least in part on the motion marker, the controller is further programmed to determine a motion classification of the key fob. The motion classification of the key fob includes at least one of: a motion toward the vehicle and a motion away from the vehicle. To activate the voice assistant of the vehicle to receive a voice command using the microphone based at least in part on the motion marker, the controller is further programmed to perform the multifactor authentication process in response to determining that the distance between the key fob and the vehicle is less than or equal to the predetermined key fob distance, that the motion marker further includes the high-fidelity motion marker, and that the motion classification of the plurality of CSI values matches the motion classification of the key fob. To activate the voice assistant of the vehicle to receive a voice command using the microphone based at least in part on the motion marker, the controller is further programmed to execute the voice command received using the microphone in response to determining that the multifactor authentication process is performed successfully.

In another aspect of the present disclosure, the first wireless module is a first digital wireless local area network (WLAN) transceiver system configured to implement a wireless communication protocol. The second wireless module is at least one of: a second digital wireless local area network (WLAN) transceiver system configured to implement the wireless communication protocol and a signal conversion device configured to convert signals between at least two frequency bands.

In another aspect of the present disclosure, the signal conversion device further may include a power source, at least two antennas, and a conversion circuit in electrical communication with the power source and the at least two antennas. The conversion circuit may include a frequency mixer in electrical communication with the at least two antennas and an oscillator in electrical communication with the frequency mixer.

In another aspect of the present disclosure, the conversion circuit further may include a first amplifier in electrical communication with the a first of the at least two antennas and the frequency mixer and a second amplifier in electrical communication with the frequency mixer and a second of the at least two antennas.

In another aspect of the present disclosure, the conversion circuit further may include a first bandpass filter in electrical communication with the first amplifier and the frequency mixer. The conversion circuit further may include a second bandpass filter in electrical communication with the frequency mixer and the second amplifier.

According to several aspects, a method for activating a voice assistant of a vehicle is provided. The method may include transmitting a plurality of original training signals on a plurality of subcarriers using a first wireless module. The method further may include receiving a plurality of propagated training signals using a second wireless module. The method further may include determining a deviation between the plurality of original training signals and the plurality of propagated training signals. The method further may include identifying a motion marker based at least in part on the deviation. The method further may include activating the voice assistant of the vehicle to receive a voice command using a microphone based at least in part on the motion marker.

In another aspect of the present disclosure, identifying the motion marker further may include determining a plurality of channel state information (CSI) values based at least in part on the deviation between the plurality of original training signals and the plurality of propagated training signals. Identifying the motion marker further may include identifying the motion marker based at least in part on the plurality of CSI values. The motion marker includes at least one of: a low-fidelity motion marker and a high-fidelity motion marker.

In another aspect of the present disclosure, identifying the motion marker further may include calculating a plurality of CSI value derivatives. At least one of the plurality of CSI value derivatives corresponds to each of the plurality of subcarriers. Identifying the motion marker further may include calculating a plurality of CSI value derivative magnitudes. Each of the plurality of CSI value derivative magnitudes is a magnitude of one of the plurality of CSI value derivatives. Identifying the motion marker further may include calculating a norm of the plurality of CSI value derivative magnitudes. Identifying the motion marker further may include calculating a time averaged norm signal based at least in part on the norm. Identifying the motion marker further may include comparing the time averaged norm signal to a predetermined time averaged norm signal threshold. Identifying the motion marker further may include identifying the low-fidelity motion marker in response to determining that the time averaged norm signal is greater than or equal to the predetermined time averaged norm signal threshold.

In another aspect of the present disclosure, identifying the motion marker further may include determining a motion classification of the plurality of CSI values using a machine learning algorithm. The machine learning algorithm is configured to receive the plurality of CSI values as an input and provide the motion classification of the plurality of CSI values as an output. The motion classification of the plurality of CSI values includes at least one of: a motion toward the vehicle and a motion away from the vehicle. Identifying the motion marker further may include identifying the high-fidelity motion marker in response to determining that the motion classification of the plurality of CSI values is the motion toward the vehicle.

In another aspect of the present disclosure, activating the voice assistant of the vehicle to receive a voice command using the microphone based at least in part on the motion marker further may include activating the microphone to receive a voice assistant keyword in response to determining that the motion marker includes the low-fidelity motion marker. Activating the voice assistant of the vehicle to receive a voice command using the microphone based at least in part on the motion marker further may include determining a location of a key fob relative to the vehicle in response to detecting the voice assistant keyword using the microphone. Activating the voice assistant of the vehicle to receive a voice command using the microphone based at least in part on the motion marker further may include performing a multifactor authentication process in response to determining that a distance between the key fob and the vehicle is less than or equal to a predetermined key fob distance and that the motion marker further includes the high-fidelity motion marker. Activating the voice assistant of the vehicle to receive a voice command using the microphone based at least in part on the motion marker further may include executing a voice command received using the microphone in response to determining that the multifactor authentication process is performed successfully.

In another aspect of the present disclosure, activating the voice assistant of the vehicle to receive a voice command using the microphone based at least in part on the motion marker further may include determining a motion classification of the key fob. The motion classification of the key fob includes at least one of: a motion toward the vehicle and a motion away from the vehicle. Activating the voice assistant of the vehicle to receive a voice command using the microphone based at least in part on the motion marker further may include performing the multifactor authentication process in response to determining that the distance between the key fob and the vehicle is less than or equal to the predetermined key fob distance, that the motion marker further includes the high-fidelity motion marker, and that the motion classification of the plurality of CSI values matches the motion classification of the key fob. Activating the voice assistant of the vehicle to receive a voice command using the microphone based at least in part on the motion marker further may include executing the voice command received using the microphone in response to determining that the multifactor authentication process is performed successfully.

In another aspect of the present disclosure, performing the multifactor authentication process further may include authenticating a person using at least one of: fingerprint recognition, voice recognition, and facial recognition.

According to several aspects, a system for activating a voice assistant of a vehicle is provided. The system may include a microphone configured to receive voice commands and a first wireless module. The first wireless module is a first digital wireless local area network (WLAN) transceiver system configured to implement a wireless communication protocol. The system further may include a second wireless module. The second wireless module is at least one of: a second digital wireless local area network (WLAN) transceiver system configured to implement the wireless communication protocol and a signal conversion device configured to convert signals between at least two frequency bands. The system further may include a controller in electrical communication with the microphone, the first wireless module, and the second wireless module. The controller is programmed to transmit a plurality of original training signals on a plurality of subcarriers using the first wireless module. The controller is further programmed to receive a plurality of propagated training signals using the second wireless module. The controller is further programmed to determine a deviation between the plurality of original training signals and the plurality of propagated training signals. The controller is further programmed to determine a plurality of channel state information (CSI) values based at least in part on the deviation between the plurality of original training signals and the plurality of propagated training signals. The controller is further programmed to identify a motion marker in the plurality of CSI values. The motion marker includes at least one of: a low-fidelity motion marker and a high-fidelity motion marker. The controller is further programmed to activate the voice assistant of the vehicle to receive a voice command using the microphone based at least in part on the motion marker.

In another aspect of the present disclosure, to identify the motion marker, the controller is further programmed to calculate a plurality of CSI value derivatives. At least one of the plurality of CSI value derivatives corresponds to each of the plurality of subcarriers. To identify the motion marker, the controller is further programmed to calculate a plurality of CSI value derivative magnitudes. Each of the plurality of CSI value derivative magnitudes is a magnitude of one of the plurality of CSI value derivatives. To identify the motion marker, the controller is further programmed to calculate a norm of the plurality of CSI value derivative magnitudes. To identify the motion marker, the controller is further programmed to calculate a time averaged norm signal based at least in part on the norm. To identify the motion marker, the controller is further programmed to continuously compare the time averaged norm signal to a predetermined time averaged norm signal threshold. To identify the motion marker, the controller is further programmed to identify the low-fidelity motion marker in response to determining that the time averaged norm signal is greater than or equal to the predetermined time averaged norm signal threshold.

In another aspect of the present disclosure, to activate the voice assistant of the vehicle to receive a voice command using the microphone based at least in part on the motion marker, the controller is further programmed to activate the microphone to receive a voice assistant keyword in response to determining that the motion marker includes the low-fidelity motion marker. To activate the voice assistant of the vehicle to receive a voice command using the microphone based at least in part on the motion marker, the controller is further programmed to determine a location of a key fob relative to the vehicle in response to detecting the voice assistant keyword using the microphone. To activate the voice assistant of the vehicle to receive a voice command using the microphone based at least in part on the motion marker, the controller is further programmed to determine a motion classification of the key fob. To activate the voice assistant of the vehicle to receive a voice command using the microphone based at least in part on the motion marker, the controller is further programmed to perform a multifactor authentication process in response to determining that a distance between the key fob and the vehicle is less than or equal to a predetermined key fob distance, that the motion marker further includes the high-fidelity motion marker, and that the motion classification of the plurality of CSI values matches the motion classification of the key fob. To activate the voice assistant of the vehicle to receive a voice command using the microphone based at least in part on the motion marker, the controller is further programmed to execute the voice command received using the microphone in response to determining that the multifactor authentication process is performed successfully.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicles may include voice assistant features which may be used to activate and/or control systems of the vehicle using voice commands. In some embodiments, voice assistants may be configured to receive commands from persons outside of the vehicle, as discussed in, for example, U.S. Pat. No. 11,600,278, titled "CONTEXT-AWARE SIGNAL CONDITIONING FOR VEHICLE EXTERIOR VOICE ASSISTANT", filed on Apr. 19, 2021, the entire contents of which is hereby incorporated by reference. Therefore, it is necessary to distinguish between intentional/authorized use of the voice assistant and unintentional/unauthorized use of the voice assistant. Accordingly, the present disclosure provides a new and improved system and method for activating a voice assistant of a vehicle based on detection of presence and motion near the vehicle using wireless communication techniques.

Figure 1:
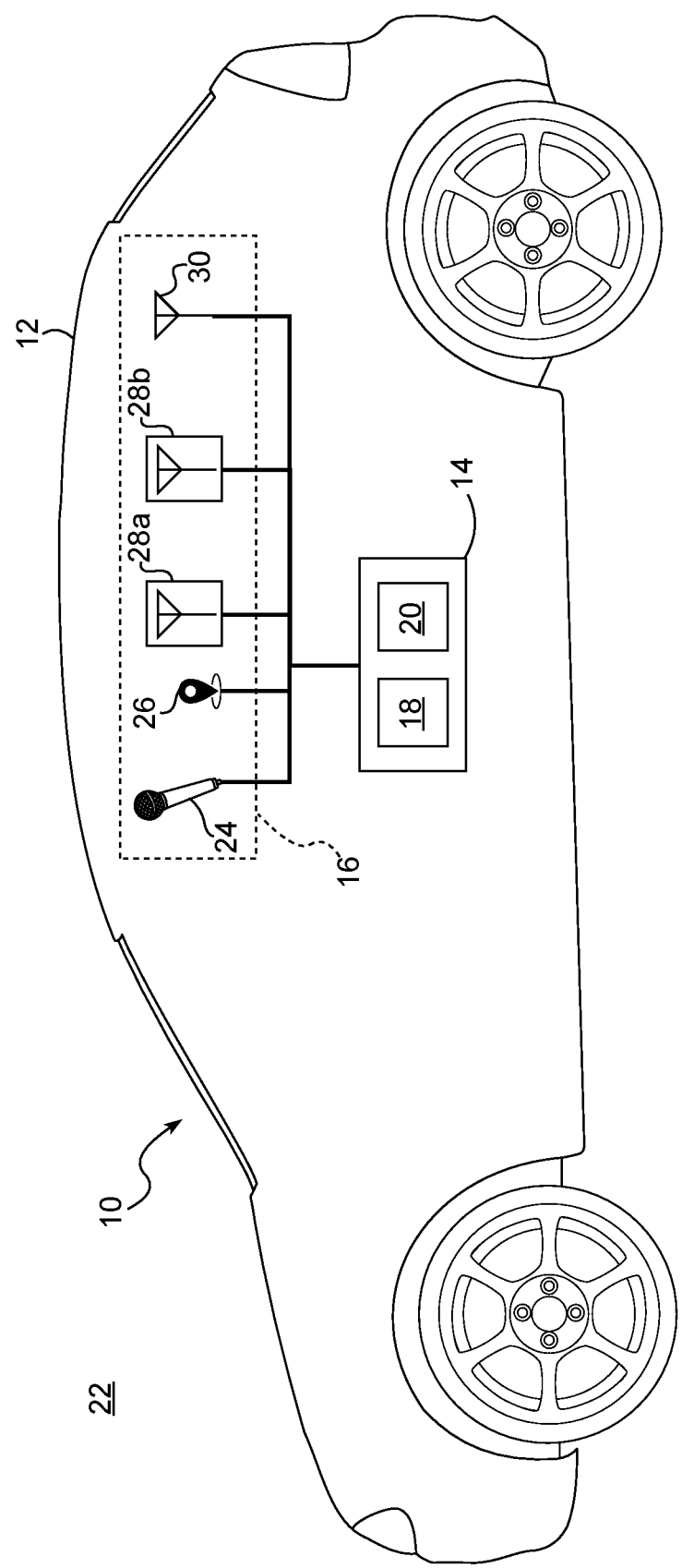
FIG. 1 is a schematic diagram of a system for activating a voice assistant of a vehicle, according to an exemplary embodiment.

Referring to FIG. 1, a system for activating a voice assistant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14 and a plurality of vehicle sensors 16.

The controller 14 is used to implement a method 100 for activating a voice assistant of a vehicle, as will be described below. The controller 14 includes at least one processor 18 and a non-transitory computer readable storage device or media 20. The processor 18 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 20 may include volatile and nonvolatile storage in read-only memory (ROM), random-access memory (RAM), and keep-alive memory (KAM), for example. KAM is a persistent or nonvolatile memory that may be used to store various operating variables while the processor 18 is powered down. The computer-readable storage device or media 20 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 are used to acquire information about an environment 22 surrounding the vehicle 12. In an exemplary embodiment, the plurality of vehicle sensors 16 includes at least a microphone 24, a global navigation satellite system (GNSS) 26, a first wireless module 28a, a second wireless module 28b, and a vehicle communication system 30.

In another exemplary embodiment, the plurality of vehicle sensors 16 further includes sensors to determine performance data about the vehicle 12. In an exemplary embodiment, the plurality of vehicle sensors 16 further includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor.

In another exemplary embodiment, the plurality of vehicle sensors 16 further includes sensors to determine information about an environment within the vehicle 12, such as, for example, a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment 22 surrounding the vehicle 12, for example, an ambient air temperature sensor, a barometric pressure sensor, and/or a photo and/or video camera which is positioned to view the environment 22 in front of the vehicle 12.

In another exemplary embodiment, at least one of the plurality of vehicle sensors 16 is capable of measuring distances in the environment 22 surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment 22 surrounding the vehicle 12. It should be understood that various additional types of vehicle sensors, such as, for example, LiDAR sensors, ultrasonic ranging sensors, radar sensors, and/or time-of-flight sensors are within the scope of the present disclosure. The plurality of vehicle sensors 16 are in electrical communication with the controller 14 as discussed above.

The microphone 24 is used to receive voice commands by converting acoustic waves into electrical signals. In an exemplary embodiment, the microphone 24 includes a unidirectional dynamic microphone (i.e., a microphone which converts acoustic waves to electrical signals using electromagnetic induction) configured to receive voice commands from a specific occupant of the vehicle 12. In another exemplary embodiment, the microphone 24 includes a plurality of microelectromechanical systems (MEMS) microphones (e.g., a microphone having a pressure-sensitive diaphragm etched directly into a silicon wafer) configured to receive voice commands. It should be understood that additional types of microphones which are configured to convert acoustic waves to electrical signals (e.g., digital and/or analog electrical signals) are included in the scope of the present disclosure. In an exemplary embodiment, the microphone 24 is disposed within a cabin of the vehicle 12 and configured to receive voice commands from occupants within the vehicle 12. In another exemplary embodiment, the microphone 24 is affixed to an exterior of the vehicle 12 and configured to receive voice commands from persons outside of the vehicle 12. It should be understood that the microphone 24 may be located anywhere within the cabin and/or on the exterior of the vehicle 12 without departing from the scope of the present disclosure.

The GNSS 26 is used to determine a geographical location of the vehicle 12. In an exemplary embodiment, the GNSS 26 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 26 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 26. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 26 may be integrated with the controller 14 (e.g., on a same circuit board with the controller 14 or otherwise a part of the controller 14) without departing from the scope of the present disclosure.

Figure 2:
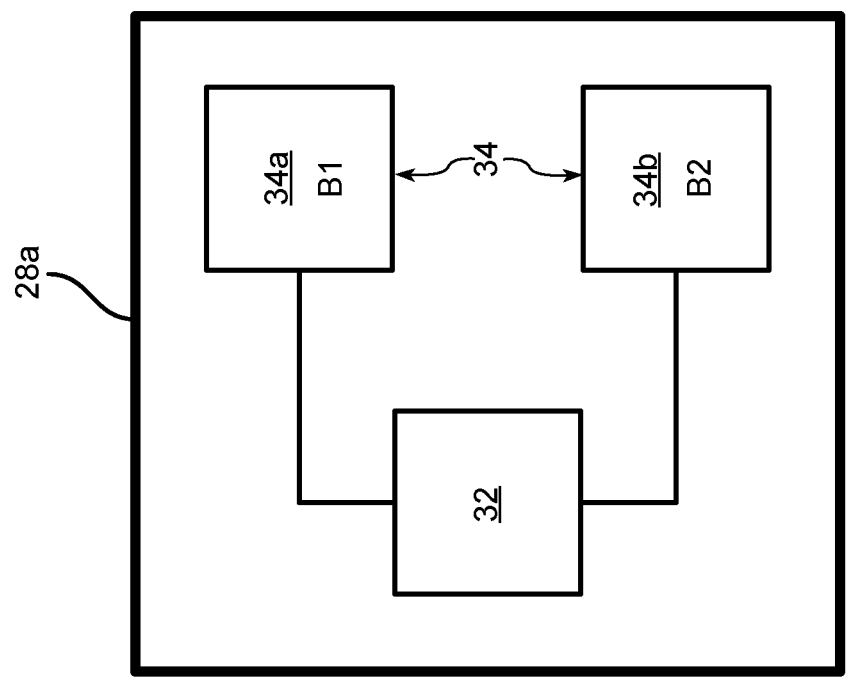
FIG. 2 is a schematic diagram of a first wireless module, according to an exemplary embodiment.

Referring to FIG. 2, a schematic diagram of the first wireless module 28a is shown. With reference to FIG. 2 and continued reference to FIG. 1, the first wireless module 28a is used to wirelessly communicate with other systems internal and/or external to the vehicle 12, for example, the second wireless module 28b. In an exemplary embodiment, the first wireless module 28a includes a wireless control module 32 capable of implementing a wireless communication protocol which employs training signals for performing channel state information (CSI) estimation. In a non-limiting example, the first wireless module 28a supports a wireless communication protocol according to one or more of the Institute of Electrical and Electronics Engineers (IEEE) 802.11 wireless local area network (WLAN) related standards. Accordingly, the first wireless module 28a is also referred to as a digital wireless local area network (WLAN) transceiver system. In an exemplary embodiment, the first wireless module 28a includes at least one wireless transceiver module 34 in electrical communication with the wireless control module 32. The at least one wireless transceiver module 34 is configured to transmit and receive signals on a first frequency band B1 (e.g., a 2.4 GHz frequency band). In another exemplary embodiment, the first wireless module 28a includes at least two wireless transceiver modules 34, as shown in FIG. 2. A first wireless transceiver module 34a is configured to transmit and receive signals on the first frequency band B1. A second wireless transceiver module 34b is configured to transmit and receive signals on a second frequency band B2 (e.g., a 5 GHz frequency band).

In an exemplary embodiment, the first frequency band B1 and/or the second frequency band B2 are divided into a plurality of subfrequencies (i.e., subcarriers). Data to be transmitted is divided into a plurality of data streams. Each of the plurality of data streams is modulated with one of the plurality of subcarriers for transmission. In an exemplary embodiment, training signals for performing channel state information (CSI) estimation are transmitted on one or more subcarriers per frequency band. In a non-limiting example, three subcarriers within the first frequency band B1 and/or the second frequency band B2 are used to transmit and/or receive training signals. In another non-limiting example, all subcarriers within the first frequency band B1 and/or the second frequency band B2 are used to transmit and/or receive training signals.

The second wireless module 28b is used to wirelessly communicate with other systems internal and/or external to the vehicle 12, for example, the first wireless module 28a. The second wireless module 28b may be implemented according to at least two exemplary embodiments. In a first exemplary embodiment, the second wireless module 28b is identical in structure and function to the first wireless module 28a as discussed above. In a second exemplary embodiment, the second wireless module 28b is a signal conversion device configured to convert signals between the first frequency band B1 and the second frequency band B2. The second exemplary embodiment of the second wireless module 28b will be discussed in reference to FIG. 3 below.

Figure 3:
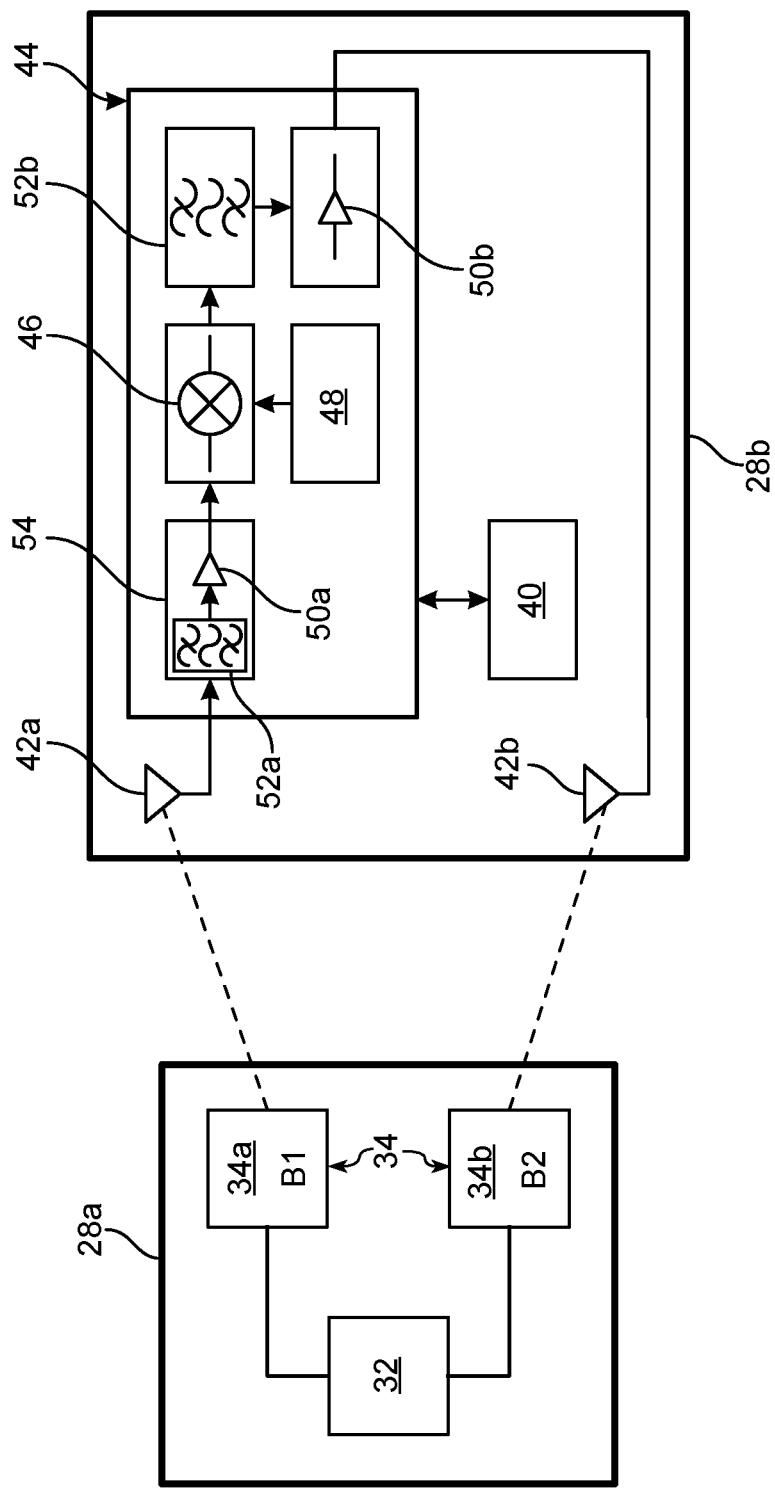
FIG. 3 is a schematic diagram of the first wireless module with a second wireless module, according to an exemplary embodiment.

Referring to FIG. 3, a schematic diagram of the first wireless module 28a with the second exemplary embodiment of the second wireless module 28b is shown. In the second exemplary embodiment, the second wireless module 28b includes a power source 40, at least two antennas (i.e., a first antenna 42a and a second antenna 42b), and a conversion circuit 44.

The power source 40 is used to provide power to the conversion circuit 44. In an exemplary embodiment, the power source 40 is a connection to a power system of the vehicle 12, for example, a twelve-volt electrical system of the vehicle 12. In another exemplary embodiment, the power source 40 is a battery. In another exemplary embodiment, the power source 40 is an energy harvesting device configured to harvest energy from, for example radio frequency signals, light, vibrations, heat, and/or the like, and transform the harvested energy into electrical energy. The power source 40 is in electrical communication with the conversion circuit 44. It should be understood that the power source 40 may be any device capable of providing electrical power to the conversion circuit 44 without departing from the scope of the present disclosure.

The at least two antennas (i.e., the first antenna 42a and the second antenna 42b) are used to transmit and/or receive wireless communication signals. The first antenna 42a is used to receive wireless communication signals on the first frequency band B1, for example, wireless communication signals transmitted by the first wireless transceiver module 34a, as shown in FIG. 3. The second antenna 42b is used to transmit wireless communication signals on the second frequency band B2, for example, wireless communication signals which may be received by the second wireless transceiver module 34b, as shown in FIG. 3. The first antenna 42a and the second antenna 42b are in electrical communication with the conversion circuit 44, as will be discussed in greater detail below.

The conversion circuit 44 is used to convert wireless communication signals between the first frequency band B1 and the second frequency band B2. In an exemplary embodiment, the conversion circuit 44 includes a frequency mixer 46, an oscillator 48, a first amplifier 50a, a second amplifier 50*b*, a first bandpass filter 52*a*, and a second bandpass filter 52*b*. In an exemplary embodiment, the first amplifier 50*a* and the first bandpass filter 52*a* are packaged as a monolithic integrated circuit referred to as a combined amplifier with bandpass filter (LNA+BPF) 54.

The frequency mixer 46 is used to convert signals received using the first antenna 42*a* between the first frequency band B1 and the second frequency band B2, also known as heterodyning. In an exemplary embodiment, the frequency mixer 46 is a passive frequency mixer including passive components, such as, for example, diodes. In another exemplary embodiment, the frequency mixer 46 is an active frequency mixer including active components, such as, for example, transistors. In a non-limiting example, the frequency mixer 46 produces a signal at a mixer output of the frequency mixer 46 which is a product of two input signals supplied to a first mixer input and a second mixer input. The first mixer input of the frequency mixer 46 is in electrical communication with the oscillator 48. The second mixer input of the frequency mixer 46 is in electrical communication with the first amplifier 50*a*. The mixer output of the frequency mixer 46 is in electrical communication with the second bandpass filter 52*b*.

The oscillator 48 is used to produce an oscillating signal with a known frequency for the frequency mixer 46. In an exemplary embodiment, the oscillator 48 is referred to as a local oscillator. In a non-limiting example, the oscillator 48 is a crystal oscillator utilizing a piezoelectric element to produce the oscillating signal. In another non-limiting example, the oscillator 48 is a variable-frequency oscillator capable of producing oscillating signals having a variable frequency. The oscillator 48 is in electrical communication with the first mixer input of the frequency mixer 46. In an exemplary embodiment, the oscillator 48 receives electrical power from the power source 40.

The first amplifier 50*a* is used to amplify signals received by the first antenna 42*a*. In an exemplary embodiment, the first amplifier 50*a* is a low-noise amplifier (LNA). LNAs are designed to amplify a very low-power signal, such as an electrical current generated by an antenna, without significantly degrading the signal-to-noise ratio of the signal. In a non-limiting example, the first amplifier 50*a* also includes filters or other electronic circuits designed to remove undesired signal and/or noise from the electrical currents generated by the first antenna 42*a*. In a non-limiting example, the power source 40 supplies power and a DC bias signal to the first amplifier 50*a*. It should be understood that various additional types and/or topologies of amplifier may be used to amplify the electrical currents generated by the first antenna 42*a*. The first amplifier 50*a* is in electrical communication with the first bandpass filter 52*a* and the second mixer input of the frequency mixer 46.

The second amplifier 50*b* is used to amplify signals produced by the frequency mixer 46 for transmission by the second antenna 42*b*. In a non-limiting example, the power source 40 supplies power and a DC bias signal to the second amplifier 50*b*. It should be understood that various additional types and/or topologies of amplifier may be used to amplify the electrical signals generated by the frequency mixer 46 for transmission by the second antenna 42*b*. The second amplifier 50*b* is in electrical communication with the second bandpass filter 52*b* and the second antenna 42*b*.

The first bandpass filter 52*a* is used to filter signals received by the first antenna 42*a*. In an exemplary embodiment, the first bandpass filter 52*a* is a passive device utilizing resistors, inductors, and/or capacitors to achieve bandpass filtering. In another exemplary embodiment, the first bandpass filter 52*a* is an active device utilizing active components such as, for example, operational amplifiers, to achieve bandpass filtering. The center frequency of the first bandpass filter 52*a* is within the first frequency band B1, for example, at a center of the first frequency band B1. The first bandpass filter 52*a* is in electrical communication with the first antenna 42*a* and the first amplifier 50*a*.

The second bandpass filter 52*b* is used to attenuate extraneous frequency components introduced by the frequency mixer 46. In an exemplary embodiment, the second bandpass filter 52*b* is a passive device utilizing resistors, inductors, and/or capacitors to achieve bandpass filtering. In another exemplary embodiment, the second bandpass filter 52*b* is an active device utilizing active components such as, for example, operational amplifiers, to achieve bandpass filtering. The center frequency of the second bandpass filter 52*b* is within the second frequency band B2, for example, at a center of the second frequency band B2. The second bandpass filter 52*b* is in electrical communication with the mixer output of the frequency mixer 46 and the second amplifier 50*b*.

Referring again to FIG. 1, the vehicle communication system 30 is used by the controller 14 to communicate with other systems external to the vehicle 12. For example, the vehicle communication system 30 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 30 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 30 may further include an embedded universal integrated circuit card (eUICC) configured to store at least one cellular connectivity configuration profile, for example, an embedded subscriber identity module (eSIM) profile. The vehicle communication system 30 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 30 may include one or more antennas and/or communication transceivers for receiving and/or transmitting signals, such as cooperative sensing messages (CSMs). The vehicle communication system 30 is configured to wirelessly communicate information between the vehicle 12 and another vehicle. Further, the vehicle communication system 30 is configured to wirelessly communicate information between the vehicle 12 and infrastructure or other vehicles. It should be understood that the vehicle communication system 30 may be integrated with the controller 14 (e.g., on a same circuit board with the controller 14 or otherwise a part of the controller 14) without departing from the scope of the present disclosure. It should further be understood that the first wireless module 28a and the second wireless module 28b may be integrated with the vehicle communication system 30 without departing from the scope of the present disclosure.

Figure 4A:
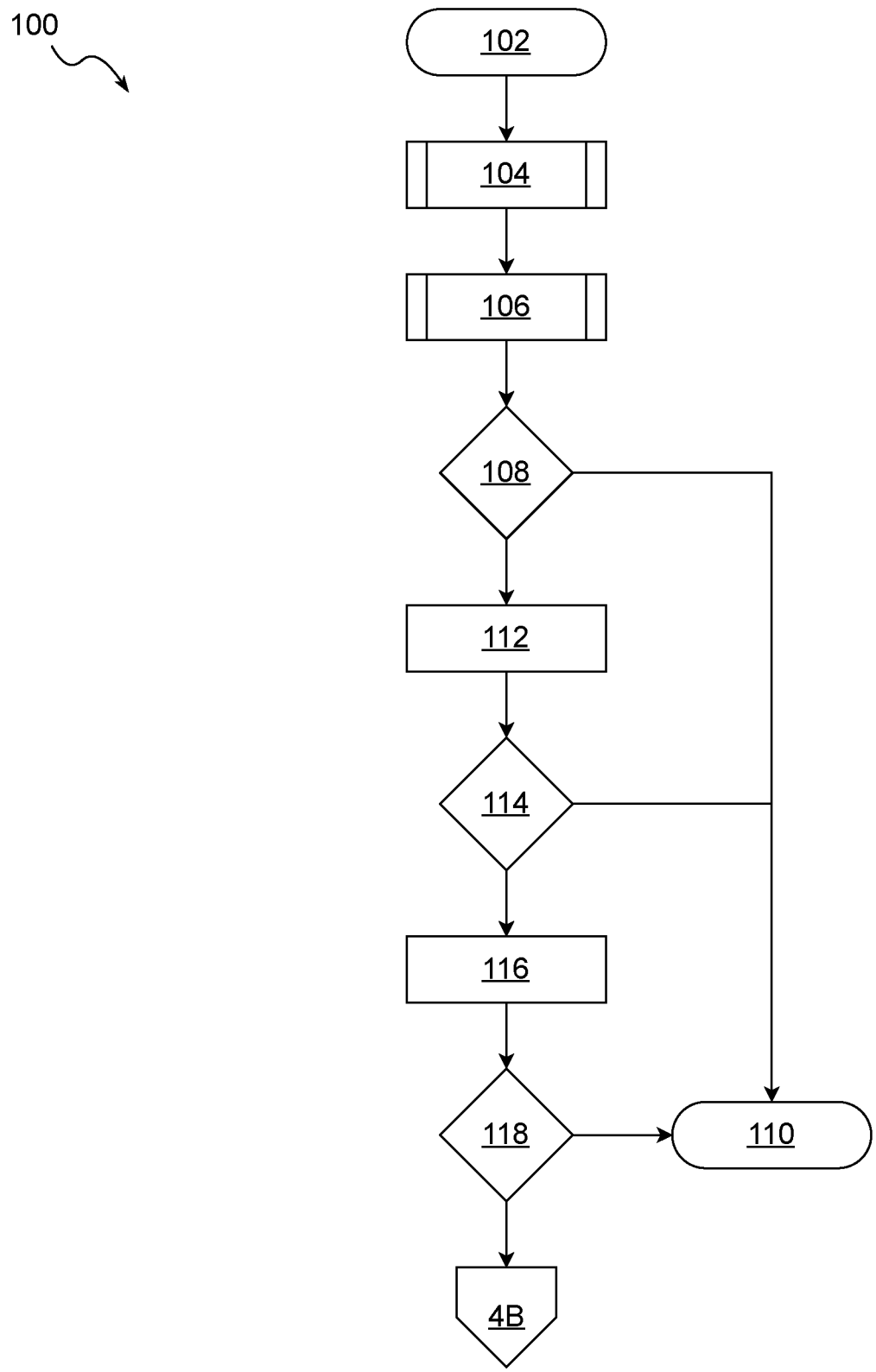
FIG. 4A is a flowchart of a method for activating a voice assistant of a vehicle, according to an exemplary embodiment.

Referring to FIG. 4A, the method 100 for activating a voice assistant for a vehicle begins at block 102 and proceeds to block 104. At block 104, the controller 14 uses the first wireless transceiver module 34a and the second wireless transceiver module 34b to determine a plurality of channel state information (CSI) values, as will be discussed in greater detail below. In the scope of the present disclosure, CSI values describe how signals propagate between the first wireless transceiver module 34a and the second wireless transceiver module 34b.

More specifically, the CSI values represent the combined effects of, for example, scattering, fading, and power decay. In other words, CSI is an estimate of frequency response for a transmission channel between two or more transceivers. In an exemplary embodiment, at least one of the plurality of CSI values corresponds to each of a plurality of subcarriers (i.e., subfrequencies), as will be discussed in greater detail below. In some applications, CSI values may be used to adapt transmission characteristics based on environmental conditions. In the present disclosure, the CSI values are used to quantify movement in the environment 22 surrounding the vehicle 12.

In a non-limiting example, the plurality of CSI values may be analyzed to identify a motion marker. In the scope of the present disclosure, the motion marker is a pattern in the plurality of CSI values corresponding to motion of a person in the environment 22 surrounding the vehicle 12. The motion marker may include at least one of: a low-fidelity motion maker and a high-fidelity motion marker. The low-fidelity motion marker is indicative of a general movement or a presence of the person in the environment 22 surrounding the vehicle 12. The high-fidelity motion marker provides more specific information, such as, for example, a location of the person relative to the vehicle 12, a movement type of the person (e.g., walking, running, jumping, waving, and/or the like), a movement direction of the person (e.g., towards the vehicle 12 or away from the vehicle 12), a movement speed of the person, and/or the like. The motion marker will be discussed in greater detail below. After block 104, the method 100 proceeds to block 106.

At block 106, the controller 14 determines whether the low-fidelity motion marker is identified in the plurality of CSI values, as will be discussed in greater detail below. After block 106, the method 100 proceeds to block 108.

At block 108, if no low-fidelity motion marker is identified at block 106, the method 100 proceeds to enter a standby state at block 110. If the low-fidelity motion marker is identified at block 106, the method 100 proceeds to block 112.

At block 112, the controller 14 activates the microphone 24. The microphone 24 is configured to receive a voice assistant keyword. In the scope of the present disclosure, the voice assistant keyword is a word or phrase which, when received by the microphone 24, triggers activation of a voice assistant. The voice assistant keyword is sometimes also referred to as a "wake word". In an exemplary embodiment, the controller 14 analyzes the sounds received by the microphone 24 using a natural language processing (NLP) algorithm to identify the voice assistant keyword. After block 112, the method 100 proceeds to block 114.

At block 114, if the voice assistant keyword is not detected using the microphone 24, the method 100 proceeds to enter the standby state at block 110. If the voice assistant keyword is detected using microphone 24, the method 100 proceeds to block 116.

At block 116, the controller 14 determines a location of a key fob relative to the vehicle 12. In the scope of the present disclosure, the key fob is a device in possession of an owner and/or operator of the vehicle 12. The key fob includes a key fob communication system, one or more key fob buttons, and a key fob controller in electrical communication with the key fob communication system and the one or more key fob buttons. Upon activation of the one or more key fob buttons, the key fob controller sends a wireless transmission using the key fob communication system. In a non-limiting example, the vehicle communication system 30 is configured to receive the wireless transmission. The controller 14 is configured to take action based on the wireless transmission, for example, unlocking one or more doors of the vehicle 12, opening a trunk of the vehicle 12, activating a horn of the vehicle 12, and/or the like.

In an exemplary embodiment, to determine the location of the key fob relative to the vehicle 12, the controller 14 uses the vehicle communication system 30. In a non-limiting example, the vehicle communication system 30 determines the location of the key fob relative to the vehicle 12 using received signal strength indicator (RSSI) based ranging. In the scope of the present disclosure, the RSSI is a value representing a power level of the wireless transmission received from the key fob. By correlating the RSSI with one or more known signal propagation characteristics (e.g., the inverse square law), the vehicle communication system 30 determines a distance between the key fob and the vehicle 12. In another non-limiting example, the vehicle communication system 30 uses ultra-wideband (UWB) based ranging to determine the distance between the key fob and the vehicle 12 (e.g., according to IEEE 802.15.4). In another non-limiting example, the vehicle communication system 30 uses personal area network communication (e.g., BLUETOOTH) to determine the distance between the key fob and the vehicle 12. It should be understood that any method for determining the distance between the key fob and the vehicle 12 is within the scope of the present disclosure. After block 116, the method 100 proceeds to block 118.

At block 118, the controller 14 compares the distance between the vehicle 12 and the key fob determined at block 116 to a predetermined key fob distance (e.g., five meters). If the distance between the vehicle 12 and the key fob is greater than the predetermined key fob distance, the method 100 proceeds to enter the standby state at block 110. If the distance between the vehicle 12 and the key fob is less than or equal to the predetermined key fob distance, the method 100 proceeds to block 120 as shown in FIG. 4B.

Figure 4B:
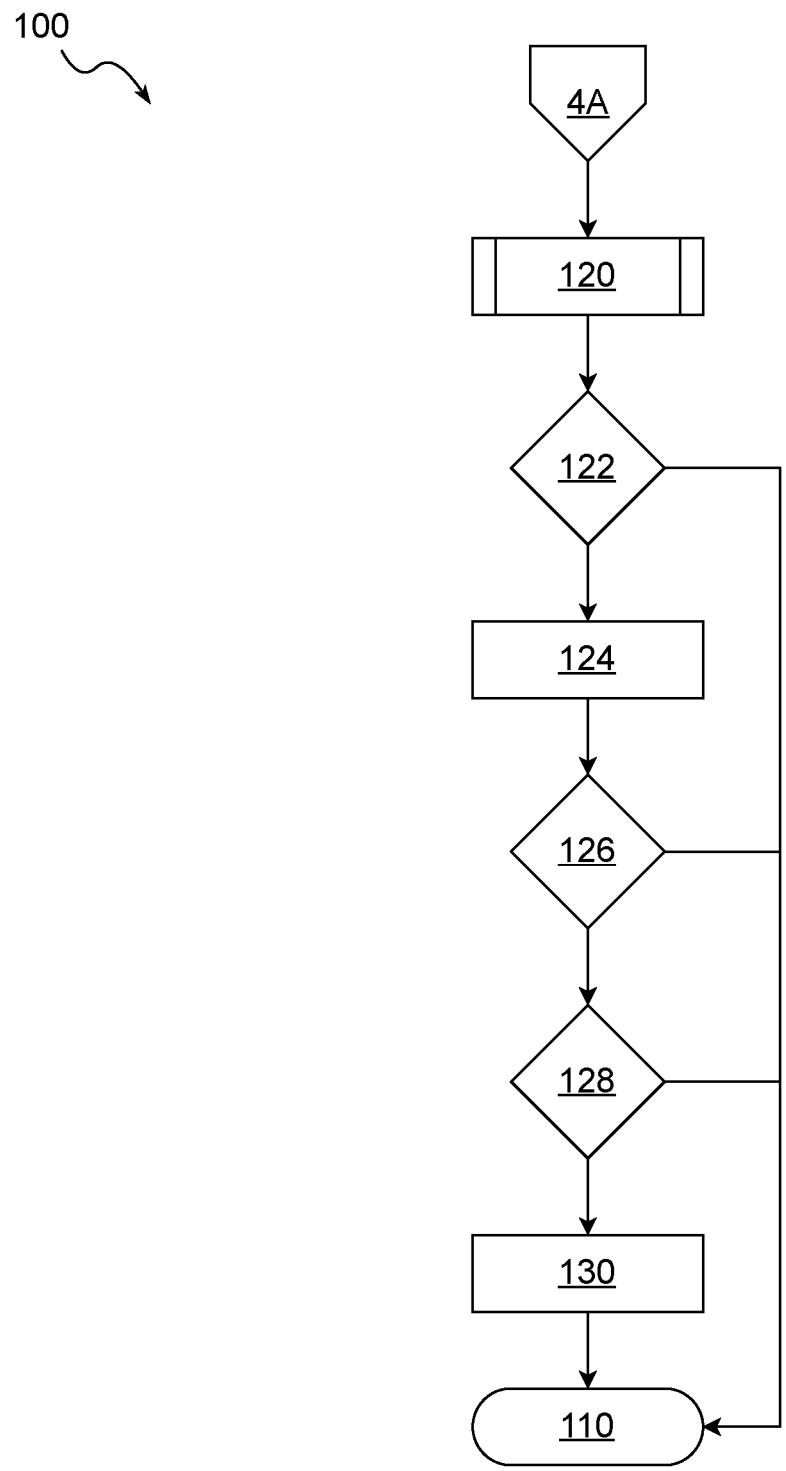
FIG. 4B is a continuation of the flowchart of FIG. 4A.

Referring to FIG. 4B, a continuation of flowchart of FIG. 4A is shown. At block 120, the controller 14 determines whether the high-fidelity motion marker is identified in the plurality of CSI values. In an exemplary embodiment, the high-fidelity motion marker is identified based at least in part on a motion classification of the plurality of CSI values. In the scope of the present disclosure, the motion classification includes, for example, a motion toward the vehicle 12, a motion away from the vehicle 12, a motion gesturing toward the vehicle 12, a motion gesturing away from the vehicle 12, and/or the like. It should be understood that the motion classification may include any qualitative and/or quantitative characterization of motion in the environment 22 surrounding the vehicle 12. For example, in some embodiments, the motion classification includes a motion signature, which is a mathematical representation (i.e., a mathematical equation, a mathematical function, a heatmap, and/or the like) of the motion in the environment surrounding the vehicle 12. Determination of the motion classification of the plurality of CSI values and identification of the high-fidelity motion marker will be discussed in greater detail below. After block 120, the method 100 proceeds to block 122.

At block 122, if no high-fidelity motion marker is identified at block 120, the method 100 proceeds to enter a standby state at block 110. If the high-fidelity motion marker is identified at block 120, the method 100 proceeds to block 124.

At block 124, the controller 14 determines a motion classification of the key fob. In an exemplary embodiment, to determine the motion classification of the key fob, the controller 14 analyzes a plurality of distances measurements between the key fob and the vehicle 12. In a non-limiting example, if the distance between the key fob and the vehicle 12 is found to be decreasing over time, the motion classification of the key fob is the motion toward the vehicle 12. In another exemplary embodiment, the controller 14 uses a machine learning algorithm trained to classify motion to determine the motion classification of the key fob. In a non-limiting example, the controller 14 provides the machine learning algorithm with a plurality of timestamped distances between the key fob and the vehicle 12. Based on the plurality of timestamped distances, the machine learning algorithm classifies the motion of the key fob. After block 124, the method 100 proceeds to block 126.

At block 126, the controller 14 compares the motion classification of the plurality of CSI values determined at block 120 to the motion classification of the key fob determined at block 124. In the scope of the present disclosure, the motion classification of the plurality of CSI values and the motion classification of the key fob are determined to match if they are the same (e.g., if the motion classification of the plurality of CSI values is the motion away from the vehicle 12 and the motion classification of the key fob is also the motion away from the vehicle 12). If the motion classification of the plurality of CSI values does not match the motion classification of the key fob, the method 100 proceeds to enter the standby state at block 110. If the motion classification of the plurality of CSI values does match the motion classification of the key fob, the method 100 proceeds to block 128.

Matching the motion classification of the key fob to the motion classification of the plurality of CSI values, as discussed above in reference to blocks 124 and 126, provides an additional verification/authentication step for activation of the voice assistant. In some embodiments, blocks 124 and 126 may be bypassed, and the method 100 may proceed directly from block 122 to block 128. In an exemplary embodiment, an owner/operator of the vehicle 12 may choose whether the blocks 124 and 126 are bypassed. In another exemplary embodiment, execution of blocks 124 and 126 are dependent on a location of the vehicle 12 as determined using the GNSS 26.

At block 128, the controller 14 performs a multifactor authentication process. In the scope of the present disclosure, the multifactor authentication process is a security mechanism which requires a person to provide two or more distinct forms of identification (i.e., "factors"). In a non-limiting example, a first factor is considered to be the successful completion of the preceding steps of the method 100 (i.e., identification of the low-fidelity motion marker, identification of the high-fidelity motion marker, localization of the key fob, and comparison of the motion classification of the key fob to the motion classification of the plurality of CSI values). A second factor includes, for example, a fingerprint recognition, a voice recognition, and/or a facial recognition. If the multifactor authentication process is not performed successfully, the method 100 proceeds to enter the standby state at block 110. If the multifactor authentication process is performed successfully (i.e., the second factor is successfully obtained and authenticated), the method 100 proceeds to block 130.

At block 130, the controller 14 executes a voice command received using the microphone 24. In an exemplary embodiment, to execute the voice command, the controller 14 modifies an operation of one or more systems and/or components of the vehicle 12. In a non-limiting example, the voice command includes an imperative to open a trunk of the vehicle 12. Therefore, to execute the voice command, the controller 14 activates a trunk latch actuator and a trunk lift actuator of the vehicle 12 to open the trunk of the vehicle 12. In another non-limiting example, the voice command includes an imperative to unlock the vehicle 12. Therefore, to execute the voice command, the controller 14 activates one or more door lock actuators of the vehicle 12 and disables a security system of the vehicle 12. It should be understood that the voice command may include various additional imperatives, interrogatives, declaratives, and/or the like, and that the controller 14 may take various additional actions to execute the voice command without departing from the scope of the present disclosure.

In an exemplary embodiment, before executing the voice command at block 130, the controller 14 checks whether the voice command is authorized based at least in part on an identity of the person issuing the voice command, as identified using multifactor authentication at block 128. In a non-limiting example, particular persons may be authorized to execute a limited set of voice commands. For example, a first exemplary person may be authorized to execute voice commands only for opening and closing a trunk of the vehicle 12. A second exemplary person may be authorized to execute all voice commands, including, for example, voice commands which activate a remote start function of the vehicle 12. After block 130, the method 100 proceeds to enter the standby state at block 110.

Figure 5:
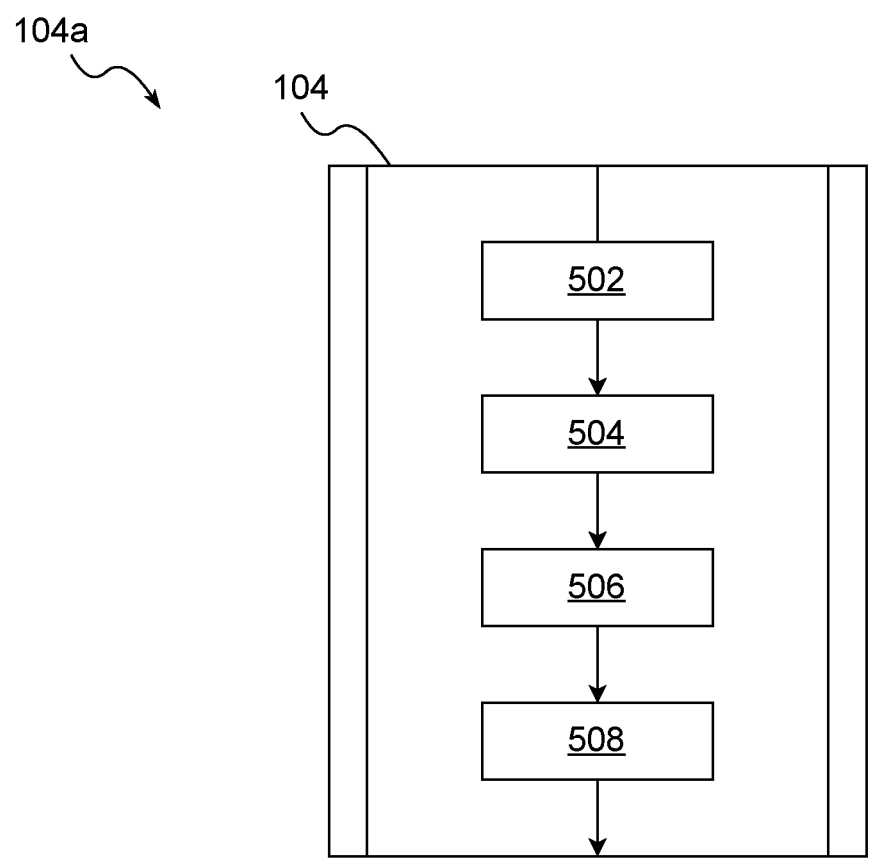
FIG. 5 is a flowchart of a first exemplary embodiment of a method for determining a plurality of channel state information (CSI) values, according to an exemplary embodiment.

Referring to FIG. 5, a flowchart of a first exemplary embodiment 104a of block 104 is shown. The first exemplary embodiment 104a utilizes an embodiment of the system 10 wherein the first wireless module 28a includes at least one wireless transceiver module 32 configured to transmit and receive signals on the first frequency band B1, and wherein the second wireless module 28b is identical in structure and function to the first wireless module 28a. The first exemplary embodiment 104a begins at block 502. At block 502, the controller 14 transmits a plurality of original training signals on the plurality of subcarriers using the first wireless module 28a. In the scope of the present disclosure, the plurality of original training signals are known signals which are transmitted for purposes of CSI value estimation. After block 502, the first exemplary embodiment 104a proceeds to block 504.

At block 504, the second wireless module 28b receives a first plurality of propagated training signals from the first wireless module 28a. The received training signals are referred to as propagated training signals because environmental characteristics result in changes to the original training signals during propagation, as discussed above. It should be understood that other devices having wireless capabilities, such as, for example, a smartphone or other mobile device in the vehicle 12 may perform the function of the second wireless module 28b in some embodiments. After block 504, the first exemplary embodiment 104a proceeds to block 506.

At block 506, the controller 14 determines a first deviation between the plurality of original training signals and the first plurality of propagated training signals. In an exemplary embodiment, the first deviation is a difference between the plurality of original training signals and the first plurality of propagated training signals. In a non-limiting example, the first deviation is one-dimensional vector including deviations corresponding to transmissions on each subcarrier frequency. After block 506, the first exemplary embodiment 104a proceeds to block 508.

At block 508, the controller 14 determines the plurality of channel state information (CSI) values. In an exemplary embodiment, the plurality of CSI values are determined based at least in part on the first deviation. After block 508, the first exemplary embodiment 104a is concluded, and the method 100 continues as discussed above.

Figure 6:
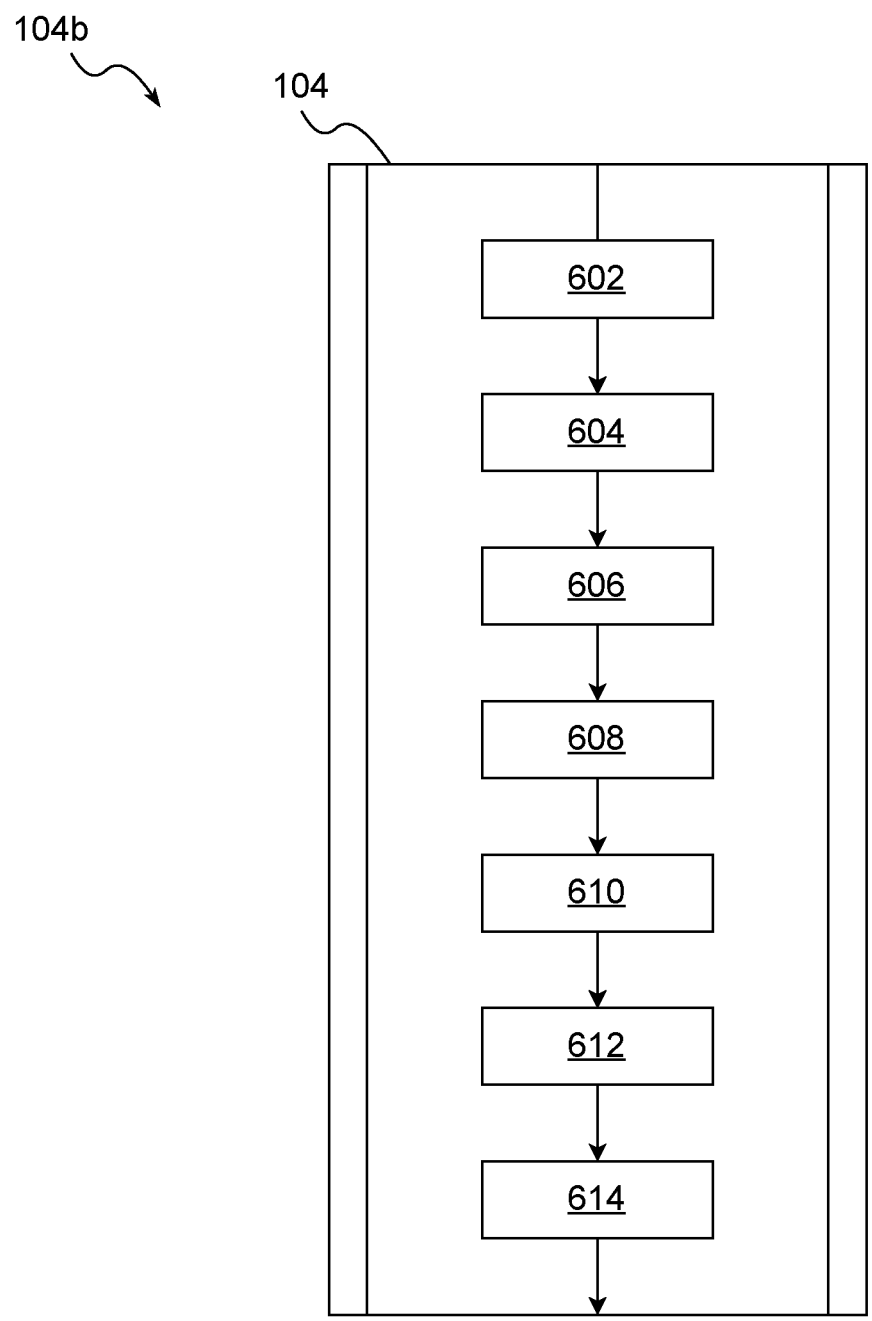
FIG. 6 is a flowchart of a second exemplary embodiment of a method for determining the plurality of channel state information (CSI) values, according to an exemplary embodiment.

Referring to FIG. 6, a flowchart of a second exemplary embodiment 104b of block 104 is shown. The second exemplary embodiment 104b utilizes an embodiment of the system 10 wherein the first wireless module 28a includes at least two wireless transceiver modules 32 and is configured to transmit and receive signals on the first frequency band B1 and the second frequency band B2, and wherein the second wireless module 28b is a signal conversion device configured to convert signals between the first frequency band B1 and the second frequency band B2. The second exemplary embodiment 104b begins at block 602. At block 602, the controller 14 transmits the plurality of original training signals on the plurality of subcarriers using the first wireless transceiver module 32a of the first wireless module 28a on the first frequency band B1. In the scope of the present disclosure, the plurality of original training signals are known signals which are transmitted for purposes of CSI value estimation. After block 602, the second exemplary embodiment 104b proceeds to block 604.

At block 604, the second wireless module 28b receives the first plurality of propagated training signals using the first antenna 42a. After block 604, the second exemplary embodiment 104b proceeds to block 606.

At block 606, the second wireless module 28b uses the conversion circuit 44 to convert the first plurality of propagated training signals received at block 604 from the first frequency band B1 to the second frequency band B2, as discussed above. After block 606, the second exemplary embodiment 104b proceeds to block 608.

At block 608, the second wireless module 28b uses the second antenna 42b to transmit the first plurality of propagated training signals on the second frequency band B2. After block 608, the second exemplary embodiment 104b proceeds to block 610.

At block 610, the first wireless module 28a uses the second wireless transceiver module 32b to receive a second plurality of propagated training signals on the second frequency band B2. The received training signals are referred to as the second plurality of propagated training signals because environmental characteristics result in changes to the first plurality of training signals during propagation, as discussed above. After block 610, the second exemplary embodiment 104b proceeds to block 612.

At block 612, the controller 14 determines a second deviation between the plurality of original training signals and the second plurality of propagated training signals. In an exemplary embodiment, the second deviation is a difference between the plurality of original training signals and the second plurality of propagated training signals. In a non-limiting example, the second deviation is one-dimensional vector including deviations corresponding to transmissions on each subcarrier frequency. After block 612, the second exemplary embodiment 104b proceeds to block 614.

At block 614, the controller 14 determines the plurality of channel state information (CSI) values. In an exemplary embodiment, the plurality of CSI values are determined based at least in part on the second deviation. After block 614, the second exemplary embodiment 104b is concluded, and the method 100 continues as discussed above.

Figure 7:
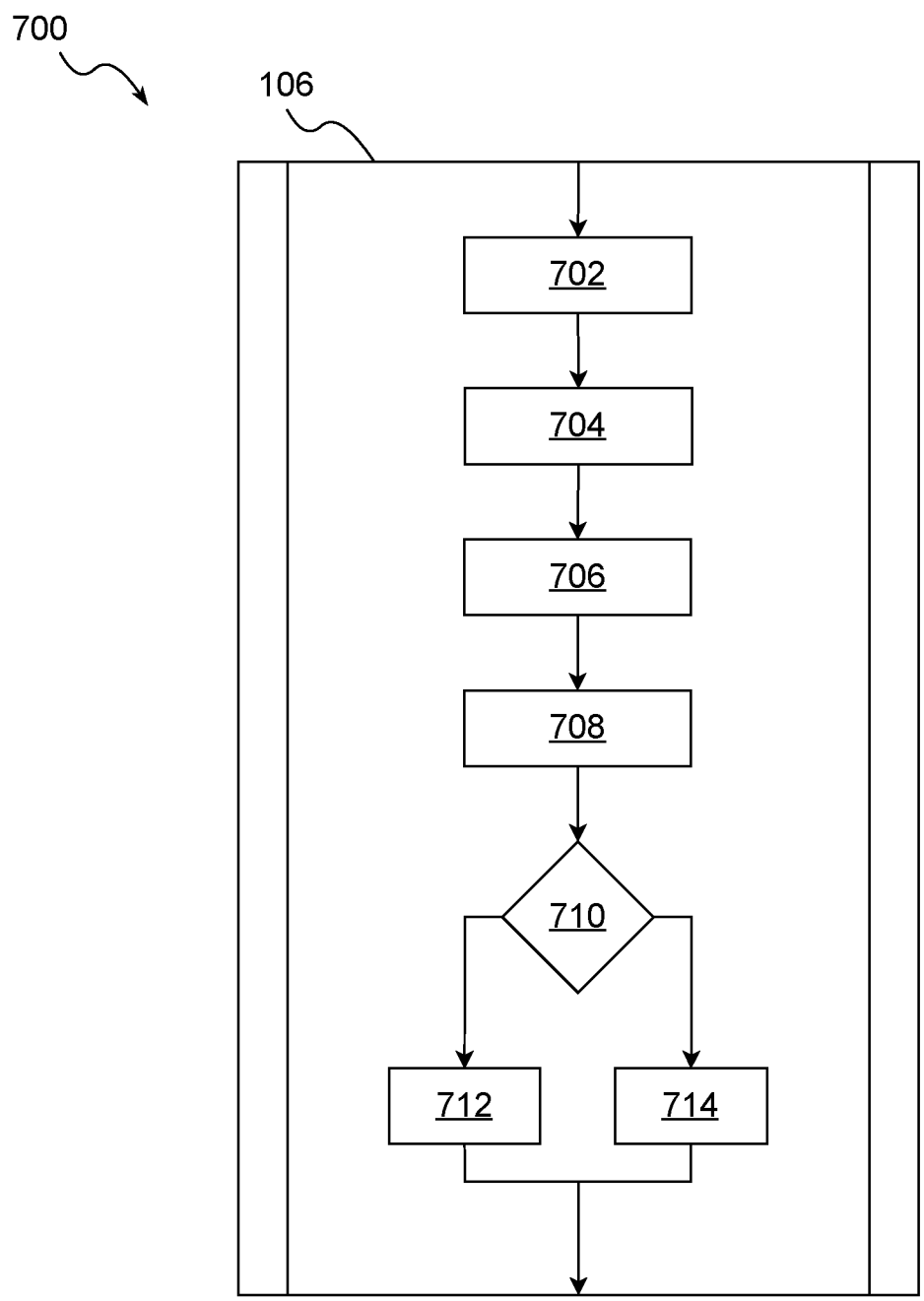
FIG. 7 is a flowchart of an exemplary embodiment of a method for identifying a low-fidelity motion marker in the plurality of channel state information (CSI) values.

Referring to FIG. 7, a flowchart of an exemplary embodiment 700 of block 106 is shown. The exemplary embodiment 700 begins at block 702. At block 702, the controller 14 calculates a plurality of CSI value derivatives. In an exemplary embodiment, the plurality of CSI values are divided into a plurality of CSI value subsets, wherein each of the plurality of CSI value subsets corresponds to one of the plurality of subcarriers. The controller 14 calculates a time-value derivative of each of the plurality of CSI value subsets. Therefore, each of the plurality of CSI value derivatives corresponds to a change in CSI value over time for each of the plurality of subcarriers. Accordingly, the plurality of CSI value derivatives are also referred to as a plurality of dynamic CSI values. After block 702, the exemplary embodiment 700 proceeds to block 704.

At block 704, the controller 14 determines a plurality of CSI value derivative magnitudes. The plurality of CSI value derivative magnitudes are also referred to as a plurality of dynamic CSI value magnitudes. In an exemplary embodiment, the each of the plurality of CSI value derivatives includes a magnitude component and a phase component. To calculate the plurality of CSI value derivative magnitudes, the controller 14 takes the magnitude of each of the plurality of CSI value derivatives, discarding the phase component. After block 704, the exemplary embodiment 700 proceeds to block 706.

At block 706, the controller 14 calculates a norm of the plurality of CSI value derivative magnitudes. In an exemplary embodiment, to calculate the norm, the controller 14 calculates a norm of a one-dimensional vector including the plurality of CSI value derivative magnitudes. In a non-limiting example, the norm is calculated as a square root of the squared sum of each of the plurality of CSI value derivative magnitudes:

$$p = \sqrt{\sum_{i=1}^{N} C_i^2} \quad (1)$$

wherein p is the norm, $C_i$ is an $i^{th}$ one of the plurality of CSI value derivative magnitudes, and N is a total quantity of the plurality of CSI value derivative magnitudes. In an exemplary embodiment, the norm is saved in the media 20 of the controller 14 along with previous and future norms for further processing, as will be discussed in greater detail below. After block 706, the exemplary embodiment 700 proceeds to block 708.

At block 708, the controller 14 calculates a time averaged norm signal. It should be understood that the method 100 and thus the exemplary embodiment 700 may be executed repeatedly, such that multiple previous norms calculated at block 706 are available in the media 20. In an exemplary embodiment, time averaged norm signal is a moving median of the previous norms calculated at block 706 and stored in the media 20. In another exemplary embodiment, the time averaged norm signal is a moving average of previous norms calculated at block 706 and stored in the media 20. It should be understood that any statistical method for smoothing short-term fluctuations in time series data is within the scope of the present disclosure. After block 708, the exemplary embodiment 700 proceeds to block 710.

At block 710, the controller 14 compares the time averaged norm signal determined at block 708 to a predetermined time averaged norm signal threshold. In an exemplary embodiment, the predetermined time averaged norm signal threshold is determined experimentally and may be adjusted to adjust a sensitivity of the system 10. If the time averaged norm signal remains greater than or equal to the predetermined time averaged norm signal threshold for at least a predetermined time-period (e.g., 2 seconds), the exemplary embodiment 700 proceeds to block 712. If the time averaged norm signal is not greater than or equal to the predetermined time averaged norm signal threshold for at least the predetermined time-period, the exemplary embodiment 700 proceeds to block 714.

At block 712, the low-fidelity motion marker is identified in the plurality of CSI values. After block 712, the exemplary embodiment 700 is concluded, and the method 100 proceeds as discussed above.

At block 714, the low-fidelity motion marker is not identified in the plurality of CSI values. After block 714, the exemplary embodiment 700 is concluded, and the method 100 proceeds as discussed above.

Figure 8:
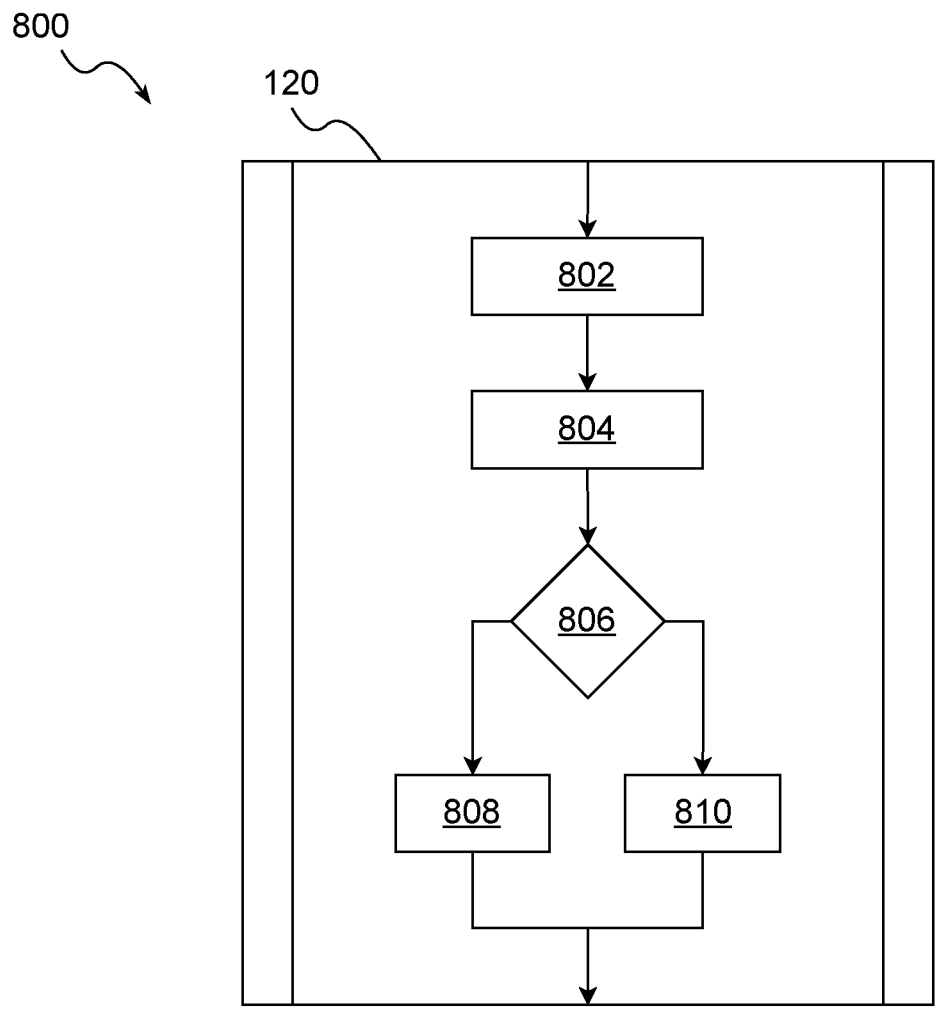
FIG. 8 is a flowchart of an exemplary embodiment of a method for identifying a high-fidelity motion marker in the plurality of channel state information (CSI) values.

Referring to FIG. 8, a flowchart of an exemplary embodiment 800 of block 120 is shown. The exemplary embodiment 800 begins at block 802. At block 802, the controller 14 preprocesses the plurality of CSI values to generate a plurality of preprocessed CSI values. In an exemplary embodiment, preprocessing the plurality of CSI values includes, for example, removing outlier data from the plurality of CSI values, filtering noise from the plurality of CSI values, normalizing the plurality of CSI values, performing a Fourier transform on the plurality of CSI values, and/or the like. After block 802, the exemplary embodiment 800 proceeds to block 804.

At block 804, the controller 14 determines a motion classification of the plurality of CSI values. In the scope of the present disclosure, the motion classification includes, for example, a motion toward the vehicle 12, a motion away from the vehicle 12, a motion gesturing toward the vehicle 12, a motion gesturing away from the vehicle 12, and/or the like. In an exemplary embodiment, to determine the motion classification of the plurality of CSI values, the controller 14 uses a machine learning algorithm trained to classify motion in the plurality of CSI values.

In a non-limiting example, the machine learning algorithm includes multiple layers, including an input layer and an output layer, as well as one or more hidden layers. The input layer receives the plurality of preprocessed CSI values as inputs. The inputs are then passed on to the hidden layers. Each hidden layer applies a transformation (e.g., a non-linear transformation) to the data and passes the result to the next hidden layer until the final hidden layer. The output layer produces the motion classification of the plurality of CSI values.

To train the machine learning algorithm, a dataset of inputs and their corresponding the motion classifications is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until the prediction error is minimized, and the resulting trained model is then used to classify new input data.

After sufficient training of the machine learning algorithm, the algorithm is capable of accurately and precisely determining the motion classification of a plurality of CSI values based on a plurality of preprocessed CSI values. By adjusting the weights between the nodes in each hidden layer during training, the algorithm "learns" to recognize patterns in the data that are indicative of different types of motion (e.g., a motion toward the vehicle 12, a motion away from the vehicle 12, a motion gesturing toward the vehicle 12, a motion gesturing away from the vehicle 12, and/or the like). After block 804, the exemplary embodiment 800 proceeds to block 806.

At block 806, if the motion classification of the plurality of CSI values determined at block 804 is equal to a preselected motion classification, the exemplary embodiment 800 proceeds to block 808. In the scope of the present disclosure, the preselected motion classification may include any motion classification, such as, for example, the motion toward the vehicle 12. If the motion classification of the plurality of CSI values determined at block 804 is not the motion toward the vehicle 12, the exemplary embodiment 800 proceeds to block 810.

At block 808, the high-fidelity motion marker is identified in the plurality of CSI values. After block 808, the exemplary embodiment 800 is concluded, and the method 100 proceeds as discussed above.

At block 810, the high-fidelity motion marker is not identified in the plurality of CSI values. After block 810, the exemplary embodiment 800 is concluded, and the method 100 proceeds as discussed above.

The system 10 and method 100 of the present disclosure offer several advantages. Using the system 10 and method 100, security and performance of a voice assistant feature of the vehicle 12 is increased by mitigating unauthorized and/or unintended activation of the voice assistant feature. Furthermore, parameters of the system 10 and/or method 100 may be adjusted. For example, the predetermined time averaged norm signal threshold may be adjusted to tune the sensitivity of the system 10 based on environmental context. In an exemplary embodiment, the GNSS 26 is used to determine a location of the vehicle 12, and the controller 14 adjusts the predetermined time averaged norm signal threshold based on the location of the vehicle 12. In an exemplary embodiment, the sensitivity of the system 10 is increased if the vehicle 12 is in a location where unauthorized use of the voice assistant feature is more likely, such as, for example, in a public parking lot.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for activating a voice assistant of a vehicle, the system comprising:
   a microphone;
   a first wireless module;
   a second wireless module;
   a controller in electrical communication with the microphone, the first wireless module, and the second wireless module, wherein the controller is programmed to:
      transmit a plurality of original training signals on a plurality of subcarriers using the first wireless module;
      receive a plurality of propagated training signals using the second wireless module;
      determine a deviation between the plurality of original training signals and the plurality of propagated training signals;
      identify a motion marker based at least in part on the deviation, wherein to identify the motion marker, the controller is further programmed to:
         determine a plurality of channel state information (CSI) values based at least in part on the deviation between the plurality of original training signals and the plurality of propagated training signals; and
         identify the motion marker based at least in part on the plurality of CSI values, wherein the motion marker includes at least one of: a low-fidelity motion marker and a high-fidelity motion marker; and
      activate the voice assistant of the vehicle to receive a voice command using the microphone based at least in part on the motion marker.

2. The system of claim 1, wherein to identify the motion marker, the controller is further programmed to:
   calculate a plurality of CSI value derivatives, wherein at least one of the plurality of CSI value derivatives corresponds to each of the plurality of subcarriers;
   calculate a plurality of CSI value derivative magnitudes, wherein each of the plurality of CSI value derivative magnitudes is a magnitude of one of the plurality of CSI value derivatives;
   calculate a norm of the plurality of CSI value derivative magnitudes;
   calculate a time averaged norm signal based at least in part on the norm;
   continuously compare the time averaged norm signal to a predetermined time averaged norm signal threshold; and
   identify the low-fidelity motion marker in response to determining that the time averaged norm signal is greater than or equal to the predetermined time averaged norm signal threshold.

3. The system of claim 1, wherein to identify the motion marker in an environment surrounding the vehicle, the controller is further programmed to:
   determine a motion classification of the plurality of CSI values using a machine learning algorithm, wherein the machine learning algorithm is configured to receive the plurality of CSI values as an input and provide the motion classification of the plurality of CSI values as an output, and wherein the motion classification of the plurality of CSI values includes at least one of: a motion toward the vehicle and a motion away from the vehicle; and
   identify the high-fidelity motion marker in response to determining that the motion classification of the plurality of CSI values is the motion toward the vehicle.

4. The system of claim 3, wherein to activate the voice assistant of the vehicle to receive a voice command using the microphone based at least in part on the motion marker, the controller is further programmed to:
   activate the microphone to receive a voice assistant keyword in response to determining that the motion marker includes the low-fidelity motion marker;
   determine a location of a key fob relative to the vehicle in response to detecting the voice assistant keyword using the microphone;
   perform a multifactor authentication process in response to determining that a distance between the key fob and the vehicle is less than or equal to a predetermined key fob distance and that the motion marker further includes the high-fidelity motion marker; and
   execute a voice command received using the microphone in response to determining that the multifactor authentication process is performed successfully.

5. The system of claim 4, wherein to activate the voice assistant of the vehicle to receive a voice command using the microphone based at least in part on the motion marker, the controller is further programmed to:
   determine a motion classification of the key fob, wherein the motion classification of the key fob includes at least one of: a motion toward the vehicle and a motion away from the vehicle;
   perform the multifactor authentication process in response to determining that the distance between the key fob and the vehicle is less than or equal to the predetermined key fob distance, that the motion marker further includes the high-fidelity motion marker, and that the motion classification of the plurality of CSI values matches the motion classification of the key fob; and
   execute the voice command received using the microphone in response to determining that the multifactor authentication process is performed successfully.

6. The system of claim 1, wherein the first wireless module is a first digital wireless local area network (WLAN) transceiver system configured to implement a wireless communication protocol, and wherein the second wireless module is at least one of: a second digital wireless local area network (WLAN) transceiver system configured to implement the wireless communication protocol and a signal conversion device configured to convert signals between at least two frequency bands.

7. The system of claim 6, wherein the signal conversion device further comprises:
   a power source;
   at least two antennas;
   a conversion circuit in electrical communication with the power source and the at least two antennas, the conversion circuit including:
      a frequency mixer in electrical communication with the at least two antennas; and
      an oscillator in electrical communication with the frequency mixer.

8. The system of claim 7, wherein the conversion circuit further comprises:
   a first amplifier in electrical communication with the a first of the at least two antennas and the frequency mixer; and a second amplifier in electrical communication with the frequency mixer and a second of the at least two antennas.

9. The system of claim 8, wherein the conversion circuit further comprises:
a first bandpass filter in electrical communication with the first amplifier and the frequency mixer; and
a second bandpass filter in electrical communication with the frequency mixer and the second amplifier.

10. A method for activating a voice assistant of a vehicle, the method comprising:
transmitting a plurality of original training signals on a plurality of subcarriers using a first wireless module;
receiving a plurality of propagated training signals using a second wireless module;
determining a deviation between the plurality of original training signals and the plurality of propagated training signals;
identifying a motion marker based at least in part on the deviation, wherein identifying the motion marker further comprises:
determining a plurality of channel state information (CSI) values based at least in part on the deviation between the plurality of original training signals and the plurality of propagated training signals; and
identifying the motion marker based at least in part on the plurality of CSI values, wherein the motion marker includes at least one of: a low-fidelity motion marker and a high-fidelity motion marker; and
activating the voice assistant of the vehicle to receive a voice command using a microphone based at least in part on the motion marker.

11. The method of claim 10, wherein identifying the motion marker further comprises:
calculating a plurality of CSI value derivatives, wherein at least one of the plurality of CSI value derivatives corresponds to each of the plurality of subcarriers;
calculating a plurality of CSI value derivative magnitudes, wherein each of the plurality of CSI value derivative magnitudes is a magnitude of one of the plurality of CSI value derivatives;
calculating a norm of the plurality of CSI value derivative magnitudes;
calculating a time averaged norm signal based at least in part on the norm;
comparing the time averaged norm signal to a predetermined time averaged norm signal threshold; and
identifying the low-fidelity motion marker in response to determining that the time averaged norm signal is greater than or equal to the predetermined time averaged norm signal threshold.

12. The method of claim 10, wherein identifying the motion marker further comprises:
determining a motion classification of the plurality of CSI values using a machine learning algorithm, wherein the machine learning algorithm is configured to receive the plurality of CSI values as an input and provide the motion classification of the plurality of CSI values as an output, and wherein the motion classification of the plurality of CSI values includes at least one of: a motion toward the vehicle and a motion away from the vehicle; and
identifying the high-fidelity motion marker in response to determining that the motion classification of the plurality of CSI values is the motion toward the vehicle.

13. The method of claim 12, wherein activating the voice assistant of the vehicle to receive a voice command using the microphone based at least in part on the motion marker further comprises:
activating the microphone to receive a voice assistant keyword in response to determining that the motion marker includes the low-fidelity motion marker;
determining a location of a key fob relative to the vehicle in response to detecting the voice assistant keyword using the microphone;
performing a multifactor authentication process in response to determining that a distance between the key fob and the vehicle is less than or equal to a predetermined key fob distance and that the motion marker further includes the high-fidelity motion marker; and
executing a voice command received using the microphone in response to determining that the multifactor authentication process is performed successfully.

14. The method of claim 13, wherein activating the voice assistant of the vehicle to receive a voice command using the microphone based at least in part on the motion marker further comprises:
determining a motion classification of the key fob, wherein the motion classification of the key fob includes at least one of: a motion toward the vehicle and a motion away from the vehicle;
performing the multifactor authentication process in response to determining that the distance between the key fob and the vehicle is less than or equal to the predetermined key fob distance, that the motion marker further includes the high-fidelity motion marker, and that the motion classification of the plurality of CSI values matches the motion classification of the key fob; and
executing the voice command received using the microphone in response to determining that the multifactor authentication process is performed successfully.

15. The method of claim 13, wherein performing the multifactor authentication process further comprises:
authenticating a person using at least one of: fingerprint recognition, voice recognition, and facial recognition.

16. A system for activating a voice assistant of a vehicle, the system comprising:
a microphone configured to receive voice commands;
a first wireless module, wherein the first wireless module is a first digital wireless local area network (WLAN) transceiver system configured to implement a wireless communication protocol;
a second wireless module, wherein the second wireless module is at least one of:
a second digital wireless local area network (WLAN) transceiver system configured to implement the wireless communication protocol and a signal conversion device configured to convert signals between at least two frequency bands;
a controller in electrical communication with the microphone, the first wireless module, and the second wireless module, wherein the controller is programmed to:
transmit a plurality of original training signals on a plurality of subcarriers using the first wireless module;
receive a plurality of propagated training signals using the second wireless module;
determine a deviation between the plurality of original training signals and the plurality of propagated training signals;

determine a plurality of channel state information (CSI) values based at least in part on the deviation between the plurality of original training signals and the plurality of propagated training signals; and identify a motion marker in the plurality of CSI values, wherein the motion marker includes at least one of: a low-fidelity motion marker and a high-fidelity motion marker; and activate the voice assistant of the vehicle to receive a voice command using the microphone based at least in part on the motion marker.

17. The system of claim 16, wherein to identify the motion marker, the controller is further programmed to:

calculate a plurality of CSI value derivatives, wherein at least one of the plurality of CSI value derivatives corresponds to each of the plurality of subcarriers;

calculate a plurality of CSI value derivative magnitudes, wherein each of the plurality of CSI value derivative magnitudes is a magnitude of one of the plurality of CSI value derivatives;

calculate a norm of the plurality of CSI value derivative magnitudes;

calculate a time averaged norm signal based at least in part on the norm;

continuously compare the time averaged norm signal to a predetermined time averaged norm signal threshold; and identify the low-fidelity motion marker in response to determining that the time averaged norm signal is greater than or equal to the predetermined time averaged norm signal threshold.

18. The system of claim 17, wherein to activate the voice assistant of the vehicle to receive a voice command using the microphone based at least in part on the motion marker, the controller is further programmed to:

activate the microphone to receive a voice assistant keyword in response to determining that the motion marker includes the low-fidelity motion marker;

determine a location of a key fob relative to the vehicle in response to detecting the voice assistant keyword using the microphone;

determine a motion classification of the key fob;

perform a multifactor authentication process in response to determining that a distance between the key fob and the vehicle is less than or equal to a predetermined key fob distance, that the motion marker further includes the high-fidelity motion marker, and that the motion classification of the plurality of CSI values matches the motion classification of the key fob; and execute the voice command received using the microphone in response to determining that the multifactor authentication process is performed successfully.

* * * * *